United States Patent [19]

Kawamura et al.

[11] 4,439,557

[45] Mar. 27, 1984

[54] COATING COMPOSITIONS

[75] Inventors: Hiroshi Kawamura, Kusatsu; Giro Mibae, Otsu, both of Japan

[73] Assignee: Toray Industries, Incorporated, Japan

[21] Appl. No.: 375,655

[22] Filed: May 6, 1982

[30] Foreign Application Priority Data

| May 8, 1981 | [JP] | Japan | 56-68351 |
| May 8, 1981 | [JP] | Japan | 56-68352 |
| May 8, 1981 | [JP] | Japan | 56-68353 |

[51] Int. Cl.³ .............................................. C08K 3/36
[52] U.S. Cl. ...................................... 523/216; 524/493
[58] Field of Search ........................ 523/216; 524/493

[56] References Cited

U.S. PATENT DOCUMENTS

| 2,777,827 | 1/1957 | Doede et al. | 523/216 |
| 3,427,187 | 2/1969 | Wiggill | 117/118 |
| 3,451,838 | 6/1969 | Burzynski et al. | 117/33.3 |
| 3,467,634 | 9/1969 | Jacknow et al. | 117/118 |
| 3,826,773 | 7/1974 | Cooke, Jr. | 523/216 |
| 3,894,881 | 7/1975 | Suzuki et al. | 106/287 SB |
| 3,986,997 | 10/1976 | Clark | 260/29.2 M |
| 4,211,823 | 7/1980 | Suzuki et al. | 428/412 |

*Primary Examiner*—Joseph L. Schofer
*Assistant Examiner*—Bernard Lipman
*Attorney, Agent, or Firm*—Scully, Scott, Murphy & Presser

[57] ABSTRACT

Provided are coating-forming coating compositions comprising the following components A and B, preferably further including the following component C and/or D, and having superior surface hardness, abrasion resistance, flexibility, dyeability and durability, as well as coatings formed by curing such coating compositions:

A. A vinyl polymer having a group represented by the general formula $R^1{}_m(R^2O)_{3-m}Si-$ wherein $R^1$ is methyl or ethyl, $R^2$ is an alkyl, alkoxyalkyl or acyl group having not more than 4 carbon atoms, with silicon being attached to the polymer by Si-C bond, and m is 0, 1 or 2.

B. Fine particles of silica having an average diameter of particles in the range of about 1 to about 200 nm.

C. A curing catalyst.

D. At least one compound selected from the group consisting of acrylic resins, polyester resins, alkyd resins, epoxy resins, cellulose resins, amino resins and silicon compounds represented by the general formula $R^5{}_aR^6{}_bSi(OR^7)_{4-(a+b)}$ wherein $R^5$ and $R^6$ are each an alkyl, alkenyl, aryl, halogenated alkyl or alkenyl group having 1 to 10 carbon atoms or an epoxy, (meth)acryloxy or cyano group, bonded to silicon by Si-C bond, $R^7$ is an alkyl, alkoxyalkyl or acyl group having 1 to 8 carbon atoms, a and b are each 0, 1 or 2 provided a+b equals 0, 1 or 2.

13 Claims, No Drawings

COATING COMPOSITIONS

BACKGROUND OF THE INVENTION

1. Field of the Invention

The present invention relates to coating compositions capable of affording coated surfaces superior in surface hardness, abrasion resistance, flexibility, dyeability and durability.

2. Description of Prior Art

Heretofore, attempts to coat articles for improving characteristics, especially surface characteristics and cosmetic quality, of the articles have often been made. Particularly, as to articles which are easily scratched, various coatings have been tried for rendering those articles difficult to be scratched. Also as to articles which are difficult to be scratched, such as glasses, ceramics and metals, the coating method is an important means for coloring them easily without impairing their characteristic that they are difficult to be scratched. In the former case, many proposals have so far been made with respect to plastic articles. For example, a silicic coating material (see U.S. Pat. Nos. 3,451,838 and 3,894,881) and a coating material of silicon compounds containing silica particles (see U.S. Pat. No. 3,986,997) have been proposed, but these materials are poor in flexibility and of more importance is that they lack sufficient dyeability. Vinyl copolymers having an alkoxysilyl group have also been proposed (see U.S. Pat. Nos. 3,427,187 and 3,467,634 and Japanese Patent Laid Open No. 43242/1979), but with these copolymers it is impossible to expect a high hardness although they are superior in adhesion and rust-preventive property for specific substances. For reference, the Japanese Patent Laid Open No. 43242/1979 has the following claim:

"A resin coposition of rust-preventive paint, comprising (A) 5 to 50 parts by weight of an acrylic copolymer, said acrylic copolymer comprising 0.1 to 50% by weight of at least one silicone monomer represented by the general formula

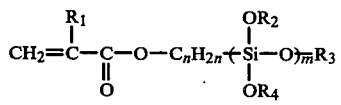

wherein $R_1$ is a hydrogen atom or methyl, $R_2$, $R_3$ and $R_4$ are each an alkyl group having 1 to 4 carbon atoms, n is an integer of 1 to 12 and m is an integer of 1 to 10, 5 to 50% by weight of styrene and not more than 94.9% by weight of vinyl monomer, and (B) 50 to 95 parts by weight of an acrylic copolymer containing 5 to 50% by weight of styrene."

Furthermore, as a dyeable coating material having a high hardness, there has been proposed a cured product of silane hydrolysate and fine particles of silica using a catalyst of aluminum compounds (see U.S. Pat. No. 4,211,823), but its insufficient stability leads to an increase of cost.

SUMMARY OF THE INVENTION

It is the object of the present invention to provide coating compositions capable of affording coated surfaces superior in surface hardness, abrasion resistance, flexibility, dyeability and durability as well as coated articles obtained by using the same.

The coating compositions of the present invention comprise the following components A and B:
- A. vinyl polymers having a group represented by the general formula $R^1{}_m(R^2O)_{3-m}Si-$ wherein $R^1$ is methyl or ethyl, $R^2$ is an alkyl, alkoxyalkyl or acyl group having not more than 4 carbon atoms, with silicon attached to the polymer by Si-C bond, and m is 0, 1 or 2, and
- B. fine particles of silica having an average diameter of particles in the range of about 1 to about 200 nm.

DESCRIPTION OF THE PREFERRED EMBODIMENT

The polymers used as component A in the present invention contain in the molecules thereof a group represented by the above-mentioned general formula. Such polymers may be prepared, for example, by the following methods.

(1) Unsaturated vinyl monomers containing a group represented by the above-mentioned general formula are homopolymerized or copolymerized with other vinyl monomers. (Vinyl monomers as referred to herein mean monomers having a polymerizable double bond such as vinyl, substituted vinyl or allyl.)

(2) Vinyl polymers having a reactive functional group are reacted with reactive compounds having a group represented by the above-mentioned general formula.

As examples of vinyl monomers having a group represented by the general formula $R^1{}_m(R^2O)_{3-m}Si-$, mention may be made of the followings: γ-(meth)acryloxypropyl trimethoxy silane, γ-(meth)acryloxypropyl triethoxy silane, γ-(meth)acryloxypropyl methyl dimethoxy silane, γ-(meth)acryloxypropyl ethyl dimethoxy silane, γ-(meth)acryloxypropyl methyl diethoxy silane, γ-(meth)acryloxypropyl dimethyl methoxy silane, vinyl trimethoxy silane, vinyl triethoxy silane, vinyl triacetoxy silane, vinyl triethoxyethoxy silane, reaction product of glycidyl(meth)acrylate and γ-aminopropyl trimethoxy silane, reaction product of (meth)acrylic acid and γ-glycidoxypropyl trimethoxy silane, reaction product of (meth)acrylic acid and γ-glycidoxypropyl methyl diethoxy silane.

Vinyl monomers having a group represented by the foregoing general formula $R^1{}_m(R^2O)_{3-m}Si-$ can polymerize even alone and the resulting polymers exhibit required physical properties, but in order to attain various practical performances it is preferable that they be copolymerized with other vinyl monomers. In this case, it is necessary to use the former in an amount not less than 3 mol%, preferably not less than 5 mol%, based on the total amount of starting monomers. At smaller amounts, it is impossible to attain a sufficient cure.

As other vinyl monomers copolymerizable with the vinyl monomers having a group represented by the general formula $R^1{}_m(R^2O)_{3-m}Si-$, there may be used various vinyl monomers which are used in the conventional vinyl polymerization, for example, alkyl esters or halogenated alkyl esters of (meth)acrylic acid, glycidyl (meth)acrylate, styrene, α-methylstyrene, vinyltoluene, (meth)acrylamide, vinyl chloride and vinyl acetate. Particularly, it is desirable to use a vinyl monomer having a hydroxyl group in an amount such that the hydroxyl value (OH value) of the resulting copolymer is not less than 10 and not more than 150. The hydroxyl value as referred to herein means a mg. number of potassium hydroxide equivalent to hydroxyl groups contained in 1 g. of polymer.

Examples of such monomers include (meth)acrylic acid esters represented by the formula

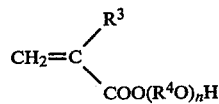

wherein $R^3$ is hydrogen or methyl, $R^4$ is an alkylene group having not more than 4 carbon atoms and n is an integer of 1 to 20, allyl alcohol, diacetone acrylamide, N-methylol acrylamide and 2-hydroxy-3-chloropropyl (meth)acrylate. In case monomers having a hydroxyl group are used in the copolymerization, the water resistance and chemical resistance of coatings formed by using the resulting copolymer are improved.

However, acidic monomers such as (meth)acrylic acid should be used so that the acid value (mg. number of potassium hydroxide required to neutralize 1 g. of polymer) of the resulting copolymer is not more than 20, preferably not more than 10. At larger acid values, the stability of the copolymer and that of a coating composition containing the same deteriorate to a great extent.

For polymerizing a vinyl monomer having a group represented by the general formula $R^1{}_m(R^2O)_{3-m}Si-$ or a mixture thereof with other vinyl monomer, there may be used known radial polymerization methods. Various polymerization methods, including bulk polymerization, are applicable, but the solution polymerization or dispersion polymerization is most preferable for the purpose of the present invention.

Solvents which may be used in the copolymerization are those capable of dissolving or stably dispersing the polymers obtained from the above-described monomers. Suitable for the purpose of the present invention are single or mixed solvents including alcoholic solvents. Examples of alcoholic solvents include aliphatic, alicyclic or aromatic alcohols having not less than 2 carbon atoms, monoalkyl or monophenyl ethers of (poly)ethylene glycol, and diacetone alcohol. In carrying out the polymerization, compounds known as radical initiators, for example, azo compounds and peroxides, may be used as polymerization catalysts. For adjusting the molecular weight of polymer, there may be used compounds known as chain transfer agents, for example, dodecyl mercaptan, butyl mercaptan and thioglycol. The molecular weight of polymer may range from 2,000 to 200,000, preferably from 5,000 to 100,000, in terms of number average molecular weight although it differs according to purposes of use and copolymer compositions.

Examples of vinyl polymers prepared by the foregoing method (2) include the reaction product of a (meth)acrylic acid copolymer and an epoxy group containing silane such as γ-glycidoxypropyl trimethoxy silane or γ-glycidoxypropyl methyl diethoxy silane, and the reaction product of a glycidoxy (meth)acrylate copolymer and an amino group containing silane such as γ-aminopropyl trimethoxy silane.

In case a group represented by the general formula $R^1{}_m(R^2O)_{3-m}Si-$ is to be introduced into a pre-polymerized vinyl polymer by the reaction of the polymer with a compound having such group, it is necessary that the said group be contained in the polymer in an amount same as or higher than in the copolymer obtained by copolymerizing not less than 3 mol%, preferably not less than 5 mol%, of a vinyl monomer containing the said group with other vinyl monomer in accordance with the foregoing method (1).

The vinyl polymer as component A preferably has the following repeating unit:

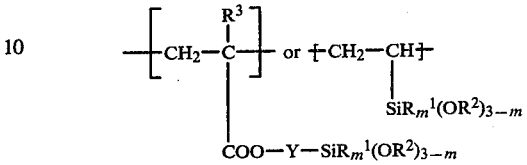

wherein Y is a divalent aliphatic radical having 2 to 10 carbon atoms, for example, an alkylene group such as ethylene linkage or propylene linkage, or an alkylene group having a hetero-atom such as a group produced by the reaction of a glycidyl group and a primary amino group or a carboxylic group.

As the fine particles of silica as component B, there may be used those having an average diameter of particles in the range of about 1 to about 200 nm, particularly preferably 5 to 100 nm, which, in the form of a powder or as dispersed in a solvent, are dispersed in the solvent in which are dissolved or dispersed other components used in the present invention.

As the solvent, substantially water-free solvents are preferably used alone or as a mixture including the same alcoholic solvents as those previously referred to as the solvent for the polymer of component A. Although adsorption water contained in the fine particles of silica and a very small amount of water introduced by moisture absorption of the solvent may be present, it is preferable that the moisture content of the entire solvent be not more than 5%. If the moisture content exceeds this value, the resulting coating composition becomes less stable. As the fine particles of silica, there may be included surface-treated, surface-coated or modified silica with a view to improving the dispersibility in the solvent or resin.

In addition, catalysts which promote the reaction when curing the coating composition may be added preferably. As such catalysts there may be used various catalysts known to promote the reaction of alkoxysilyl or acetoxysilyl alone or with silanol and/or hydroxyl group [for example, see W. Noll "Chemistry and Technology of Silicones," Academic Press (1967)]. Particularly, one or two or more of the following compounds may be preferably used as the catalyst:

1. Alkoxide compounds of aluminum or coordination compounds obtained by bonding coordinating compounds to aluminum.

2. Alkoxide compounds of titanium or coordination compounds obtained by bonding coordinating compounds to titanium.

3. Coordination compounds obtained by bonding coordinating compounds to Zn(II), Co(II), Fe(II), Cr(III), Mn(II), Ca(II), Co(III), Cu(II), Mg(II), or Ni(II).

The above aluminum, titanium or other metal compounds contribute to the promotion of curing speed, namely, the shortening of curing time and/or the lowering of curing temperature in curing the coating composition of the present invention, and make it possible to improve physical properties of the resulting coating.

Examples of the above compounds 1 include those represented by the general formula $AlX'_n Y'_{3-n}$ wherein $X'$ is an alkoxy group having 1 to 6 carbon atoms, $Y'$ is a ligand obtained from coordinating compounds known to bond to aluminum, and n is 0, 1, 2 or 3, such as aluminum triethoxide, aluminum tri n-propoxide, aluminum tri i-propoxide, aluminum tri n-butoxide, aluminum tri i-butoxide, aluminum tri sec-butoxide, aluminum t-butoxide, aluminum tri n-amyloxide, aluminum tri n-hexoxide, aluminum di i-propoxide monomethyl acetoacetate, aluminum di n-butoxide monoethyl acetoacetate, aluminum mono i-propoxide diacetylacetonate, aluminum acetylacetonate, aluminum methyl acetoacetate bisacetylacetonate, aluminum ethyl acetoacetate bisacetylacetonate, aluminum bismethyl acetoacetate acetylacetonate, and aluminum bisethyl acetoacetate acetylacetonate.

Examples of the above compounds 2 include those represented by the general formula $Ti.X^2_n.Y^2_{4-n}$, or their condensates, wherein $X^2$ is a hydroxyl group or an alkoxy group having 1 to 8 carbon atoms, $Y^2$ is a neutral or acidic ligand obtained from coordinating compounds having 1 to 6 carbon atoms heretofore known to bond to titanium and n is 2, 3 or 4, such as tetraethoxy titanium, tetra i-propoxy titanium, tetra n-butoxy titanium, tetra (2-ethylhexoxy) titanium, tetra i-propoxy titanium oligomer, tetra i-propoxy titanium polymer, tetra n-butoxy titanium oligomer, tetra n-butoxy titanium polymer, di i-propoxy bis(acetylacetonate) titanium, dihydroxy bis(lactato) titanium, trihydroxy mono(lactato) titanium, dihydroxy bis(tartarato) titanium, and dihydroxy bis(citrato) titanium.

Examples of the above compounds 3 include those comprising coordinating compounds such as diketones, ketoesters, ketoximes and dipyridyl bonded to the metal elements as previously enumerated, preferably coordination compounds of acetylacetone represented by the general formula $M(CH_3COCHCOCH_3)_{n1}(OR^5)_{n2}$ wherein M is Zn(II), Co(II), Fe(II), Cr(III), Mn(III), Ca(II), Co(III), Cu(II), Mg(II), or Ni(II) where the parenthesized numerals represent the valence number of the corresponding elements, $n^1 + n^2$ equals a numeral corresponding to valence number and is 2 or 3, $n^2$ is 0, 1 or 2 and $R^5$ is an alkyl group having 1 to 4 carbon atoms. Hydrates of these compounds are also employable.

These catalysts may be used alone or in combination of two or more in an amount of 0.01 to 20, preferably 0.1 to 10, parts by weight based on 100 parts by weight of the sum of solids consisting of the components A, B and other coating-forming component(s). Smaller amounts are little effective in promoting cure, and larger amounts cause deterioration of physical properties, such as cracking, of coatings formed from the resulting coating compositions.

As set forth hereinbefore, the coating compositions of the present invention are obtained by mixing the components A and B. In this mixing operation, if there is adopted a method wherein the copolymerization for the component A is carried out in the presence of the component B, it becomes possible to perform both production of the component A and mixing of the components A and B simultaneously. The components A and B are mixed in such a ratio as 50 to 250, preferably 70 to 200, parts by weight of component B based on 100 parts by weight of the sum of component A and other coating-forming component(s). Larger proportions of component B would cause cracking of coatings formed from the resulting coating compositions, and smaller proportions thereof would result in lowering of hardness and insufficient curing property. In applying the coating compositions of the present invention to articles to be coated, there may be added in addition to the components A and B a catalyst capable of being dispersed or dissolved in the solvent used in order to promote curing of the compositions, and this is as previously noted. Furthermore, for improving the working efficiency in the coating operation and characteristics of the resulting coating, various solvents, additives and resins may be added as necessary. As solvents or diluents there may be used various solvents known as solvents for coating compositions such as various alcohols, ethers, ketones, esters, aliphatic, alicyclic and aromatic hydrocarbons. As the solvent to be used when applying the coating composition, it should contain at least 10% by weight of an alcoholic solvent.

As additives there may be used various surfactants with a view to improving the surface smoothness, for example, silicone compound surfactants, fluorine compound surfactants and other organic surfactants. An UV absorber and an antioxidant may also be added. The addition of a coating improver is also preferable, examples of which are organic polymers highly compatible with the compositions of the present invention such as thermoplastic or thermosetting acrylic resins, polyester resins, alkyd resins, epoxy resins and cellulose resins, particularly silicon compounds represented by the following general formula are preferred: $R^5_a R^6_b Si(OR^7)_{4-(a+b)}$ wherein $R^5$ and $R^6$ are each an alkyl, alkenyl, aryl, halogenated alkyl or alkenyl group having 1 to 10 carbon atoms or an organic group having an epoxy, (meth)acryloxy or cyano group, bonded to the silicon by Si-C bond, $R^7$ is an alkyl, alkoxyalkyl or acyl group having 1 to 8 carbon atoms, a and b are each 0, 1 or 2 provided a+b equal 0, 1 or 2.

Examples of such silicon compounds are tetraalkoxy silanes such as methyl silicate, ethyl silicate, n-propyl silicate, i-propyl silicate, n-butyl silicate, sec-butyl silicate and t-butyl silicate, trialkoxy or triacyloxy silanes such as methyl trimethoxy silane, methyl triethoxy silane, methyl trimethoxyethoxy silane, methyl triacetoxy silane, methyl tributoxy silane, ethyl trimethoxy silane, ethyl triethoxy silane, vinyl trimethoxy silane, vinyl triethoxy silane, vinyl triacetoxy silane, vinyl trimethoxyethoxy silane, phenyl trimethoxy silane, phenyl triethoxy silane, phenyl triacetoxy silane, γ-chloropropyl trimethoxy silane, γ-chloropropyl triethoxy silane, γ-chloropropyl triacetoxy silane, 3,3,3-trifluoropropyl trimethoxy silane, γ-glycidoxypropyl trimethoxy silane, γ-glycidoxypropyl triethoxy silane, γ-(β-glycidoxyethoxy) propyl trimethoxy silane, β-(3,4-epoxycyclohexyl) ethyl trimethoxy silane, β-(3,4-epoxycyclohexyl) ethyl triethoxy silane, γ-methacryloxypropyl trimethoxy silane and γ-cyanopropyl triethoxy silane, and dialkoxy or diacyloxy silanes such as dimethyl dimethoxy silane, phenyl methyl dimethoxy silane, dimethyl diethoxy silane, phenyl methyl diethoxy silane, γ-glycidoxypropyl methyl dimethoxy silane, γ-glycidoxypropyl methyl diethoxy silane, γ-glycidoxypropyl phenyl dimethoxy silane, γ-glycidoxypropyl phenyl diethoxy silane, γ-chloropropyl methyl dimethoxy silane, γ-chloropropyl diethoxy silane, dimethyl diacetoxy silane, γ-methacryloxypropyl methyl dimethoxy silane, γ-methacryloxypropyl methyl diethoxy silane, methyl vinyl dimethoxy silane and methyl vinyl diethoxy silane.

These silicon compounds are effective in improving the hardness, chemical resistance and particularly resistance to organic solvents.

As another preferred additive, mention may be made of a group of compounds commonly called amino resins. The amino resins indicate methylol derivatives of urea, melamine (2,4,6-triamino-1,3,5-triazine) and 2-hydrocarbyl-4,6-diamino-1,3,5-triazine, or compounds resulting from alkyletherification of a part or the whole of methylol groups contained in these methylol derivatives, and condensation products of these compounds. Examples of such amino resins include dimethylol urea, trimethylol urea, tetramethylol urea, dimethylol urea dimethyl ether, dimethylol urea dibutyl ether, and condensates thereof; tetramethylol melamine, pentamethylol melamine, hexamethylol melamine, and methyletherified, n-butyletherified and i-butyletherified derivatives thereof, as well as condensation products of these methyloled or alkylmethyloled melamines; tetramethylol benzoguanamine, tetramethylol benzoguanamine n-butyl ether, and condensates of these methyloled or n-butylmethyloled benzoguanamines.

These compounds may be used alone or as a mixture of two or more.

One important effect of these amino resins is a stabilization effect for the resulting coating composition, that is, the increase in viscosity and gelation of the coating composition can be suppressed noticeably by their presence.

Moreover, by the use of these amino resins it becomes easy to simultaneously use resins having acid radical and hydroxyl group commonly known as thermosetting acrylic resins. N-methylolacrylamide copolymer known as a self-condensing acrylic resin or its alkyletherified derivative is also employable.

The coating-forming components other than component B as hereinabove described may be used as mixtures containing component A, but in this case it is necessary that the component A should be contained at least 15%. If its content is smaller than 15%, the hardness of the resulting coating will not be improved.

The components other than components A and B are for improving the water resistance, weatherability, dyeability, adhesion or chemical resistance according to uses of coatings formed from the coating compositions of the present invention.

The coating compositions of the present invention are applicable to various substrates, including those which are poor in scratch resistance such as plastics and coated articles, and those which are very hard but whose surfaces cannot be colored in a simple and easy manner such as inorganic glasses, ceramics and metals. In the application to these materials the compositions of the present invention can exhibit characteristic features.

As the method of applying the compositions of the invention to articles to be coated, there may be used various known methods, for example, brush coating, dip coating, spin coating, flow coating, spray coating, roller coating and curtain flow coating.

In applying the coating compositions of the invention, various physical or chemical pretreatments or the application of a primer may be performed. Particularly, in case ceramic articles such as pottery and glass are to be coated, a silane coupling reagent is preferably applied with or without an acrylic resin or epoxy resin as a primer on it. The compositions of the invention well adhere to acrylic resins and epoxy resins, so these resins are employable preferably as a primer.

The coating composition thus applied to the substrate is cured by subsequent heating. The heating temperature ranges from 80° to 300° C., preferably from 100° to 250° C., though it differs according to substrates, curing times and contents of the compositions to be applied.

The compositions of the invention may be colored in various modes. For example, coloring materials such as pigments and dyestuffs may be incorporated in the compositions, but as a characteristic mode of embodiment of the compositions, dyeing with dyestuffs is feasible. As the dyeing method, there may be applied dip dyeing in a solution of a disperse dye, an acid dye, a basic dye, an anionic dye, a cationic dye or a metal complex dye dissolved in a solvent consisting mainly of water, or picturing or printing may be made using a viscous dyestuff paste or ink prepared by kneading a liquid disperse dye or a disperse dye with a paste-like material or a surfactant, or a mixture thereof, and water. Transfer printing of a pattern on a transfer paper impregnated with a sublimation disperse dye is also adoptable. In the dyeing, the color fastness can be improved by heating. It goes without saying that if there is used a material easy to be dyed as a substrate for the coating formed from the composition of the invention, the dyeing becomes easier. In this case, the coating formed from the composition of the invention is effective in improving the color fastness.

The following examples are given to illustrate the invention more in detail.

EXAMPLE 1, COMPARATIVE EXAMPLE 1

(1) Preparation of Silane Copolymerized Acrylic Varnish 128 g. of n-propanol was charged into a four-necked 1 liter flask equipped with a reflux condenser and a thermometer and heated at an inside temperature of 90±2° C. Then, 30 g. of methyl methacrylate, 56 g. of ethyl acrylate, 14 g. of 2-hydroxyethyl methacrylate, 35 g. of methacryloxypropyl trimethoxy silane and 1.35 g. of n-dodecyl mercaptan as a chain transfer reagent were mixed, in which was then added and dissolved homogeneously 1.35 g. of azobisisobutyronitrile as a polymerization catalyst. The resulting solution was added dropwise into the flask over a period of about 2 hours while adjusting the inside temperature to 90±2° C. Thereafter, at every 30 minutes, azobisisobutyronitrile was added three times each 0.27 g., and after stirring for another 1 hour the polymerization was completed. The varnish thus prepared had a viscosity of 4.56 poise, a solid content of 50.8% and a hydroxyl value of 45 (based on solids).

(2) Preparation of Coating Composition 16 g. of the silane copolymerized acrylic varnish prepared in (1) and 40 g. of n-propanol silica sol (average diameter of particles: 13±nm) having a solid content of 30% by weight were mixed thoroughly, and 24 g. of n-propanol was further added to adjust the solid content of the resulting coating composition to 25%.

(3) Application and Evaluation of Coating

The coating composition prepared in (2) was applied to substrates A and B to a dry coating thickness of 1.5 μm by dip coating and then baked for 1 hour in an air drying oven at 180° C. The results of coating tests are as set out in Table 1 in comparison with a commercially available thermosetting acrylic paint for appliance use (paint of Comparative Example 1).

As the substrate A, a 1.5 mm thick glass plate (slide glass) was used, onto which was applied a silane coupling reagent (a 0.5% solution of a hydrolyzate of γ-glycidoxypropyl trimethoxy silane in a mixture of methanol and n-propanol) by dip coating, onto which was further applied also by dip coating a thermosetting clear paint obtained by first preparing a 70/30/10 (weight ratio of solids) blend of acryl ("Coatax SA105" manufactured by Toray Industries Inc.) and melamine ("Superbeckamine G821" manufactured by Dainippon Ink and Chemicals, Inc.) and epoxy ("Epikote 1001" manufactured by Shell Chemical Co.) and then adjusting its solid content to 22.5% with a thinner, followed by baking at 160° C. for 20 minutes to give a coating thickness of 5 μm. The so-coated glass plate was used as the substrate A.

As the substrate B, a 0.8 mm thick mild steel plate (manufactured by Nippon Test Panel Co.) which had been treated with "Bonderite #144" was used, onto which were applied by spray coating a varnish comprising a 70/20/10 (weight ratio of solids) blend of acryl ("Coatax SA105" manufactured by Toray Industries Inc.), melamine ("Superbeckamine G821" manufactured by Dainippon Ink and Chemicals, Inc.) and epoxy ("Epikote 1001" manufactured by Shell Chemical Co.) as well as titanium white ("RCR-3" manufactured by ICI Co.), as a thermosetting white paint after adjusting to P/V=1/1, followed by baking at 160° C. for 20 minutes to give a coating thickness of about 25 μm.

Throughout the working and comparative examples performances of the coatings obtained were evaluated in the following manner.

a. Adhesion

In cross cut and tape test, completely good coatings are marked as 100/100.

b. Steel Wool Hardness (SW Hardness)

The coating surface is rubbed with steel wool #0000 and the degree of scratch is judged as follows.
A ... Not scratched at all.
B ... Slightly scratched.
C ... Scratched throughout the surface to about the same extent as ordinary organic plastics.

c. Erichsen Value

Using Erichsen testing machine, the extrusion depth not causing crack of coating is expressed by millimeter.

d. Impact Resistance

Using Du Pont impact tester, a 500 g. weight is dropped onto a ½-inch dia. spindle and the height of drop not causing crack of coating is expressed by centimeter.

e. Resistance to Boiling Water

A coating substrate is immersed in boiling water for a predetermined period of time, then the external appearance, for example, the existence of a crack or swelling, and the state of adhesion of the coating are checked and evaluated in the following manner.
0 ... Not changed at all.
Δ ... A slight deterioration is observed in the external appearance or adhesion.
× ... The external appearance is greatly changed and the adhesion is lowered.

f. Dyeability

After dipping in a disperse dye bath (three colors mix-red, yellow, blue) at 90° C. for 15 minutes, the degree of dyeing is checked.

g. Stain Resistance

Red, blue and black colors are applied to the coating surface with a lipstick and a felt marker, then after standing at 23° C. for 24 hours, the colors are wiped off with a gause impregnated with n-butanol and the wiped-off degree is checked and evaluated in the following manner.
0 ... Not stained at all.
Δ ... Slightly stained.
× ... Fairly stained.

EXAMPLE 2

1 g. of aluminum acetylacetonate was added and dissolved into the coating composition prepared in (2) of Example 1. The solid content of the coating composition was 25%.

In the same way as in (3) of Example 1, the coating composition was applied to the substrates A and B to a dry coating thickness of about 1.5 um by dip coating and then baked for 30 minutes in an air drying oven held at 180° C. The results of tests applied to the coating are set out in Table 1.

TABLE 1

| Substrate | A | A | B | B | B |
|---|---|---|---|---|---|
| Name of Coating Composition | Coating composition prepared in Example 1 | Coating composition prepared in Example 2 | Coating composition prepared in Example 1 | Coating composition prepared in Example 2 | Thermosetting acrylic paint (for appliance use)* |
| Coating Appearance | Good | Good | Good | Good | Good |
| Adhesion | 100/100 | 100/100 | 100/100 | 100/100 | 100/100 |
| Hardness (SW) | B | B | A~B | A~B | C |
| Erichsen Value | — | — | 4.9 mm | 5.0 mm | >5.0 mm |
| Impact Resistance | — | — | 45 cm | 45 cm | 50 cm |
| Resistance to Boiling Water (30 minutes) | O | O | O | O | O |
| Dyeability | Good | Good | — | — | — |

TABLE 1-continued

| Substrate Name of Coating Composition | A Coating composition prepared in Example 1 | A Coating composition prepared in Example 2 | B Coating composition prepared in Example 1 | B Coating composition prepared in Example 2 | B Thermosetting acrylic paint (for appliance use)* |
|---|---|---|---|---|---|
| Stain Resistance (lipstick) | O | O | O | O | O |
| Stain Resistance (felt marker) | O | O | O | O | Δ |

(Note)
*Same paint as the white paint applied to the substrate B.

From the results shown above it is seen that the application of the coating compositions of the present invention greatly contributes to the improvement in surface hardness and stain resistance and to the impartment of dyeability.

EXAMPLE 3

(1) Preparation of Silane Copolymerized Acrylic Varnish

In the same way as in Example 1, 180 g. of n-propanol was charged into the flask. Then, 30 g. of methyl methacrylate, 56 g. of ethyl acrylate, 14 g. of 2-hydroxyethyl methacrylate, 100 g. of methacryloxypropyl trimethoxy silane and 2 g. of n-dodecyl mercaptan were mixed, into which was then added and dissolved 2 g. of azobisisobutyronitrile, and the resulting solution was added dropwise into the flask to allow polymerization to take place. Thereafter, azobisisobutyronitrile was added three times each 0.4 g. in the same manner as in Example 1. Other conditions than the composition just described above were the same as in Example 1. The resulting varnish had a viscosity of 4.40 poise, a solid content of 49.0% and a hydroxyl value of 30 (based on solids).

(2) Preparation of Coating Composition

The procedure of Example 2 was followed.

(3) Application and Coating Evaluation

In the same manner as in Example 2, the coating composition thus prepared was applied to substrates A and C, then baked and the coating thereby formed was evaluated. As the substrate C, a 1.5 mm thick glass plate (slide glass) was used, onto which was applied a silane coupling reagent (a 0.5% solution of a hydrolyzate of γ-glycidoxypropyl trimethoxy silane in a mixture of methanol and n-propanol) by dip coating.

In both cases of the substrates A and C, the results of coating evaluation were as follows: coating appearance and adhesion . . . good, steel wool hardness . . . A~B, dyeability . . . good.

EXAMPLE 4

(1) Preparation of Silane Copolymerized Acrylic Varnish

In the same way as in Example 1, 108 g. of n-propanol was charged into the flask. Then, 30 g. of methyl methacrylate, 56 g. of ethyl acrylate, 14 g. of 2-hydroxyethyl methacrylate, 15.4 g. of methacryloxypropyl trimethoxy silane and 1.2 g. of n-dodecyl mercaptan were mixed, in which was then dissolved 1.2 g. of azobisisobutyronitrile, and the resulting solution was added dropwise into the flask to allow polymerization to take place. Thereafter, azobisisobutyronitrile was added three times each 0.23 g. in the same manner as in Example 1. Other conditions than the composition just described above were the same as in Example 1. The resulting varnish had a viscosity of 4.46 poise, a solid content of 51.2% and a hydroxyl value of 52 (based on solids).

(2) Preparation of Coating Composition

The procedure of Example 2 was followed.

(3) Application and Coating Evaluation

In the same way as in Example 2, the coating composition thus prepared was applied to substrate A, then baked and the coating thereby formed was evaluated. The results were as follows: coating appearance and adhesion . . . good, steel wool hardness . . . B, stain resistance (lipstick and felt marker) . . . good, dyeability . . . good. Thus, the results show characteristic features of the coating composition of the invention.

EXAMPLE 5

(1) Preparation of Silane Copolymerized Acrylic Varnish

In the same way as in Example 1, polymerizations were carried out in such ratios of starting materials as shown in Table 2 to prepare five kinds of varnishes.

TABLE 2

| Name of Starting Material | Varnish No. | | | | |
|---|---|---|---|---|---|
| | A | B | C | D | E |
| n-propanol (polymerization solvent) | 128 | 128 | 128 | 128 | 128 |
| Methyl methacrylate | 38 | 43 | 47.4 | 30 | 30 |
| Ethyl acrylate | 32 | 14.3 | — | 56 | 56 |
| Butyl acrylate | 16 | 28.7 | 38.6 | — | — |
| 2-hydroxyethyl methacrylate | 14 | 14 | 14 | 14 | 14 |
| Methacryloxypropyl trimethoxy silane | 35 | 35 | 35 | 35 | 35 |
| n-dodecyl mercaptan | 1.35 | 1.35 | 1.35 | 0.68 | — |
| Azobisisobutyronitrile | 1.35 | 1.35 | 1.35 | 1.35 | 1.35 |

Thereafter, azobisisobutyronitrile was added three times each 0.27 g. in the same manner as in Example 1. The solid contents and hydroxyl values of the resulting varnishes were within the range of 50 to 52% and the range of 43 to 45, respectively.

(2) Preparation of Coating Composition

In the same way as in Example 2, coating compositions were prepared from the varnishes A through E obtained in the above (1).

(3) Application and Coating Evaluation

In the same manner as in Example 2, the coating compositions thus prepared were applied to substrates A and B, then baked and the coatings thereby formed were evaluated, the results of which are shown in Table 3 in comparison with the thermosetting acrylic paint for appliance use of Comparative Example 1.

TABLE 3

| Item of Evaluation | A | B | C | D | E | Thermosetting acrylic paint (for appliance use) |
|---|---|---|---|---|---|---|
| Substrate A used | | | | | | |
| Hardness (SW) | B | B | B | B | B | |
| Adhesion | 100/100 | 100/100 | 100/100 | 100/100 | 100/100 | |
| Resistance to Boiling Water (1 hour) | O | O | O | O | O | |
| Dyeability | Good | Good | Good | Good | Good | |
| Substrate B used | | | | | | |
| Gloss (60° gloss) | 88 | 89 | 89 | 89 | 89 | 87 |
| Adhesion | 100/100 | 100/100 | 100/100 | 100/100 | 100/100 | 100/100 |
| Hardness (SW) | A | A | A~B | A | A | C |
| Stain Resistance (lipstick) | O | O | O | O | O | O |
| Stain Resistance (felt marker) | O | O | O | O | O | Δ |

From the above results it is seen that the coating compositions prepared in Example 5 attain a remarkable improvement in surface hardness as well as characteristics contrary to each other, namely, stain resistance and dyeability, in a well-balanced manner.

EXAMPLE 6

(1) Preparation of Silane Copolymerized Acrylic Varnish

In the same way as in Example 1, 128 g. of n-propanol was charged into the flask. Then, 40 g. of methyl methacrylate, 60 g. of ethyl acrylate, 35 g. of methacryloxypropyl trimethoxy silane and 1.35 g. of n-dodecyl mercaptan were mixed, in which was then dissolved 1.35 g. of azobisisobutyronitrile, and the resulting solution was added dropwise into the flask to allow polymerization to take place. Thereafter, azobisisobutyronitrile was added three times each 0.27 g. Other conditions than the composition just described above were the same as in Example 1. The resulting varnish had a viscosity of 4.40 poise, a solid content of 50.0% and a hydroxyl value of substantially zero (based on solids).

(2) Preparation of Coating Composition

The procedure of Example 2 was repeated.

(3) Application and Coating Evaluation

In the same manner as in Example 2, the coating composition thus prepared was applied to substrates A and B, then baked and the coating thereby formed was evaluated, the results of which were as follows: coating appearance and adhesion . . . good, steel wool hardness . . . B (in the case of substrate A), A (in the case of substrate B), dyeability . . . good.

EXAMPLE 7

Using the silane copolymerized acrylic varnish prepared in Example 1, coating compositions were prepared in the same manner as in Example 2 except that the mixing ratio of the acrylic varnish and n-propanol silica sol was changed as shown in Table 4. The coating compositions thus prepared were applied to substrate A in the same way as in Example 2, then baked and the resulting coatings were evaluated, the results of which are shown also in Table 4.

TABLE 4

| | Acryl/Sol Ratio *1 | | |
|---|---|---|---|
| Item of Evaluation | 60/40 | 50/50 | 45/55 |
| Coating Appearance | Good | Good | Good |
| Adhesion | 100/100 | 100/100 | 100/100 |
| Hardness (SW) | B | B | A ~ B |
| Resistance to Boiling Water (3 hours) | O | O | O |
| Dyeability | Good | Good | Good |

(Note)
*1: weight ratio of solids

From the results shown above it is seen that the mixing ratios as referred to herein are satisfactory.

EXAMPLE 8

In place of aluminum acetylacetonate used in the preparation of the coating composition in Example 2, various catalysts as shown in Table 5 were added each alone. The resulting coating compositions were applied to substrate A in the same manner as in Example 1, then baked at 180° C. for 30 minutes and the coatings thus formed were evaluated, the results of which are set out in Table 5.

TABLE 5

| Catalyst Name | Coating Appearance | Hardness (SW) |
|---|---|---|
| Magnesium acetylacetonate | Good | B |
| Manganese (III) acetylacetonate | Good | B |
| Copper (II) acetylacetonate | Good | B |
| Cobalt (III) acetylacetonate | Good | B |
| Dibutoxy titanium bis(acetylacetonate) | Good | A ~ B |
| Tetra i-propoxy titanium* | Good | A ~ B |

(Note)
*0.5 g. added, solid content of coating composition 10%

EXAMPLE 9

1.6 g. of glycidoxypropyl methyl diethoxy silane was homogeneously mixed and sissolved into the coating compositions prepared in Examples 2 and 6, and the resulting coating compositions, in the same manner as in Example 2, were applied to substrate A, then baked and the coatings thus formed were evaluated. In both cases, the results were as follows: coating appearance and adhesion . . . good, steel wool hardness . . . B, dyeability . . . good.

EXAMPLE 10

The coating compositions prepared in Examples 1 and 2 were applied to substrate A in the same manner as in Example 1, then baked at 160° C. for 1 hour and at 180° C. for 1 hour. The coatings thus formed were evaluated in the same way as in Example 1 and both coating compositions were compared with each other, the results of which are set out in Table 6.

TABLE 6

| | Baking Condition | | | |
|---|---|---|---|---|
| | 160° C. × 1 hour | | 180° C. × 1 hour | |
| | Name of Coating Composition | | | |
| Item of Evaluation | Coating composition of Example 2 | Coating composition of Example 1 | Coating composition of Example 2 | Coating composition of Example 1 |
| Hardness (SW) | B | C | B | B |
| Resistance to Boiling Water (1 hour) | O | Δ | O | O ~ Δ |

From the results shown above, the effect of the catalyst component is recognized.

EXAMPLE 11

12.8 g. of the silane copolymerized acrylic varnish prepared in (1) of Example 1 and 1.6 g. of melamine resin ("Cymel 303" manufactured by Mitsui Toatsu Chemicals, Inc.) were mixed, then 40 g. of n-propanol silica sol (average diameter of silica particles: 13±1 nm) was added and mixed thoroughly, followed by further addition of 29.2 g. n-propanol, 0.16 g. silicone surfactant, to obtain of coating composition having a solid content of 25% and a viscosity of 16 cP.

Then, in the same way as in (3) of Example 1 the coating composition thus prepared was applied to substrates A and B by dip coating to a dry coating thickness of about 1.5 μm and baked for 1 hour in an air drying oven held at 180° C. The results of test applied to the resulting coating are set out in Table 7.

TABLE 7

| | Substrate | | |
|---|---|---|---|
| | A | B | |
| | Name of Coating Composition | | |
| Item of Evaluation | Coating composition of Example 11 | Coating composition of Example 11 | Thermosetting acrylic paint for appliance use (comparative paint*) |
| Coating Appearance | Good | Good | Good |
| Adhesion | 100/100 | 100/100 | 100/100 |
| Hardness (SW) | B | B | C |
| Erichsen Value | — | 5.0 mm | >5.0 mm |
| Resistance to Boiling Water (1 hour) | O | O | O |
| Dyeability | Good | — | — |
| Stain Resistance (lipstick) | O | O | O |
| Stain Resistance (felt marker) | O | O | Δ |

(Note)
*Same paint as the white paint applied to Substrate B.

From the results shown above it is seen that the application of the coating composition of the invention attains a remarkable improvement in surface hardness as well as characteristics contrary to each other, namely, stain resistance and dyeability, in a well-balanced manner.

EXAMPLE 12

(1) Preparation of Silane Copolymerized Acrylic Varnish

In the same way as in Example 1, four kinds of varnishes were prepared in such monomer ratios as shown in Table 8. The viscosities and solid contents of those varnishes were all within the range of 4.0 to 6.0 and the range of 49.0 to 53.0%, respectively, and their hydroxyl values were A 57.0, B 29.9 and C 19.9 (based on solids).

(2) Preparation of Coating Composition

In the same manner as in Example 11, coating compositions were prepared from varnishes A, B, C and D.

(3) Application and Coating

In the same way as in Example 1, the coating compositions were each applied to substrate C, then baked and the coatings thereby formed were evaluated, the results of which are as shown in Table 9.

TABLE 8

| | Coating Composition No. | | | |
|---|---|---|---|---|
| Name of Starting Material | A | B | C | D |
| n-propanol (charge solvent) | 108 | 180 | 250 | 75 |
| Methyl methacrylate | 30 | 30 | 30 | — |
| Ethyl acrylate | 56 | 56 | 56 | — |
| 2-hydroxyethyl methacrylate | 14 | 14 | 14 | — |
| Methacryloxypropyl trimethoxy silane | 15.4 | 100 | 200 | 100 |
| n-dodecyl mercaptan | 1.2 | 2 | 3 | 1 |
| Azobisisobutyronitrile | 1.2 | 2 | 3 | 1 |
| Subsequently added azobisisobutyronitrile | 0.23 × 3 times | 0.4 × 3 times | 0.6 × 3 times | 0.2 × 3 times |

TABLE 9

| | Coating Composition No. | | | |
|---|---|---|---|---|
| Item of Evaluation | A | B | C | D |
| Coating Appearance | Good | Good | Good | Good |
| Adhesion | 100/100 | 100/100 | 100/100 | 100/100 |
| Hardness (SW) | B | B | A ~ B | B |
| Stain Resistance (lipstick) | O | O | O | O |
| Stain Resistance (felt marker) | O | O | O | O |
| Dyeability | Good | Good | Good | Dyeable |

EXAMPLE 13

In place of the melamine resin "Cymel 303" which is one component of the coating composition prepared in Example 11, there were used each 1.6 g. of a. "Cymel 350", b. "Cymel 370" (melamine resins manufactured by Mitsui Toatsu Chemicals, Inc.) and 2 g. c. "Sumimal M40S" (melamine resin manufactured by Sumitomo Chemical Co.) to prepare coating compositions.

Then, in the same manner as in Example 1, the coating compositions thus prepared were applied to substrate A, then baked and the resulting coatings were evaluated, the results of which are as shown in Table 10.

TABLE 10

| | Name of Coating Composition | | |
|---|---|---|---|
| Item of Evaluation | a | b | c |
| Coating Appearance | Good | Good | Good |

TABLE 10-continued

| | Name of Coating Composition | | |
|---|---|---|---|
| Item of Evaluation | a | b | c |
| Adhesion | 100/100 | 100/100 | 100/100 |
| Hardness (SW) | B | B | B |
| Stain Resistance (lipstick) | O | O | O |
| Stain Resistance (felt marker) | O | O | O |
| Dyeability | Good | Good | Good |

EXAMPLE 14

1.0 g. of aluminum acetylacetonate was added and dissolved into the coating solution obtained in Example 11. Then, in the same way as in Example 2, the resulting coatings thus formed were evaluated. As to durability, the following weatherability test was conducted. The results are set out in Table 11 in comparison with the termosetting acrylic paint for appliance use of Comparative Example 1.

Weatherability Test

A test using a sunshine weather meter (manufactured by Suga Testing Machine Co.) and an outdoor exposure test (in Otsu City, Shiga Prefecture, Japan) are conducted for a predetermined time or period and the coatings are checked for appearances, such as gloss, crack, blister, yellowing and stain.

(1) Preparation of Comparative, Silane Hydrolyzate Coating Composition

A. Preparation of Silane Hydrolyzate 38.6 g. of γ-glycidoxypropyl methyl diethoxy silane was charged into a reaction vessel equipped with a stirrer, then 5.60 g. of an aqueous 0.05 N hydrochloric acid solution was slowly added dropwise with stirring while the liquid temperature was held at 10° C. 44.2 g. of the reaction product was mixed with 20.8 g. of γ-chloropropyl trimethoxy silane, then 5.65 g. of an aqueous 0.01 N hydrochloric acid solution was slowly added dropwise while maintaining the liquid temperature at 10° C.

B. Preparation of Coating Composition 60.6 g. of the hydrolyzate prepared above, 135.4 g. of methanol silica sol (manufactured by Nissan Chemical Co., solid content 30%, average diameter of particles: 13±1 nm), 10.3 g. of diethylene glycol dimethyl ether, 79.2 g. of methanol and 0.45 g. of a silicone compound surfactant were mixed with stirring, then 4.06 g. of aluminum acetylacetonate was dissolved therein, and to 150 parts by weight of the resulting mixed solution there was added 3.75 parts by weight of acetylacetone.

(3) Method of Testing Stability of Coating Composition

TABLE 11

| | Substrate | | |
|---|---|---|---|
| | A | B | |
| | Name of Coating Composition | | |
| Item of Evaluation | Coating Composition of Example 14 | Coating composition of Example 14 | Thermosetting acrylic paint (white) for appliance use (comparative paint*) |
| Gloss (60° gloss) | — | 89 | 87 |
| Adhesion | 100/100 | 100/100 | 100/100 |
| Hardness (SW) | B | A | C |
| Erichsen Value | — | 5.0 mm | >5.0 mm |
| Resistance to Boiling Water (1 hour) | O | O | O |
| Stain Resistance (lipstick) | O | O | O |
| Stain Resistance (felt marker) | O | O | Δ |
| Dyeability | Good | — | — |
| Weatherability Sunshine Weather Meter (500 hours) | No change | No change | Slightly yellowed |
| Outdoor Exposure (3 months) | No change | No change | Slightly stained |

Note
*Same paint as the white paint applied to substrate B.

EXAMPLE 15, Comparative Example 2

The coating composition prepared in Example B 11, the coating composition "c" prepared in Example 13 and the coating composition of Example 14 were each placed in a glass vessel capable of being tightly stoppered, then allowed to stand at 40° C. and checked for stability. As a comparative example, the following silane hydrolyzate coating composition known as a dyeable, highly curable material was used.

Coating composition is placed in a glass vessel capable of being tightly stoppered, which vessel in turn is placed in a thermostatic oven held at 40° C., then changes with time of the viscosity of the coating composition and coating performance are checked and compared with the characteristic values before the test. The viscosity was determined using a B type viscosimeter (manufactured by Tokyo Precision Instrument Co.).

The coating compositions were applied to substrate A, then baked and evaluated in the same manner as in Example 1. The results are as shown in Table 12, from which it is seen that the coating compositions of the invention have a high stability.

TABLE 12

| Coating Composition | Before Test | | After 7 days | | After 14 days | | After 30 days | |
|---|---|---|---|---|---|---|---|---|
| | Viscosity (cP) | Hardness (SW) | Viscosity (cP) | Hardness (SW) | Viscosity (cP) | Hardness (SW) | Viscosity (cP) | Hardness (SW) |
| Coating Composition of Example 11 | 16.0 | B | 17.5 | B | 19.0 | B | 21.0 | B |
| Coating Composition "c" of Example 13 | 16.5 | B | 19.0 | B | 21.5 | B | 25.0 | B |
| Coating Composition of Example 14 | 19.0 | B | 22.0 | B | 23.8 | B | 27.0 | B |
| Comparative Paint | 3.5 | B | 5.0 | lower than C | — | — | — | — |

EXAMPLE 16

(1) Preparation of Silane Copolymerized Acrylic Varnish

The procedure of (1) in Example 1 was repeated.

(2) Preparation of Acrylic Varnish containing Acid Radical and Hydroxyl Group In the same way as in Example 1, 100 g. of n-propanol as a polymerization solvent was charged into the flask. Then, 20 g. of methyl methacrylate, 56 g. of ethyl acrylate, 14 g. of 2-hydroxyethyl methacrylate, 10 g. of acrylic acid and 1 g. of n-dodecyl mercaptan were mixed, in which was then dissolved 1 g. of azobisisobutyronitrile, and the resulting solution was added dropwise into the flask to allow polymerization to take place. Thereafter, azobisisobutyronitrile was added three times each 0.2 g. Other conditions than the composition just described above were the same as in Example 1. The resulting varnish had a solid content of 50.0% and an acid value of 77 (based on solids).

(3) Preparation of Coating Composition

The varnishes prepared in the above (1) and (2) were mixed in the ratio of 50/50 (weight ratio), and using the mixed varnish there were prepared a coating composition A obtained in the same manner as in Example 14 and a coating composition B obtained by removing the melamine resin from the coating composition A.

(4) Application and Coating Evaluation

In the same way as in Example 2, the coating compositions were applied to substrates A and B, then baked and the coatings thus formed were evaluated. The results obtained were the same as in the use of the coating composition of Example 14.

(5) Stability of Coating Composition

The coating compositions A and B obtained in the above (3) were subjected to an accelerated stability test in the same manner as in Example 15, the results of which are as shown in Table 13.

TABLE 13

| 40° C. × days | Coating Composition No. | |
|---|---|---|
| | A | B |
| Initially | 18.5 | 17.0 |
| After 7 days | 20.5 | 39.5 |
| After 14 days | 20.5 | 51.5 |
| After 30 days | 20.5 | 71.0 |

(Note)
The above numerals represent viscosity in cP (at 20° C.)

Also, the coating compositions obtained in Example 16 were applied and baked in the same manner as in the above (4) after subjected to an accelerated stability test at 40° C. for 30 days, and the coatings thus formed were evaluated in the same way. The results were the same as the initial ones.

EXAMPLE 17

(1) Application and Baking

In the same way as in Example 1, the coating composition prepared in Example 14 was applied to substrates A and C and then baked.

(2) Dyeing

The coated articles obtained in (1) were dyed according to the following methods A, B and C.

A. Dip Dyeing 5 g. of red disperse dye (manufactured by Nippon Kayaku Co.), 6 g. of a dispersing agent and 1 g. of a dyeing promoter were dispersed in 1 liter of water. Also, a blue disperse dye (manufactured by Mitsui Toatsu Chemicals, Inc.) and a yellow disperse dye (manufactured by Daito Chemical Co.) were each dispersed in same manner in the same blending ratio. In this way, dyeing baths of three colors were prepared. The dyeing baths were heated to 90° C., into which were then dipped and dyed the coated articles for 15 minutes. As a result, clear and fast dyed articles of red, blue and yellow were obtained.

B. Hand Dyeing

Red, blue, yellow and black paste dyes (manufactured by Nippon Kayaku Co.) were applied to brushes directly or after diluted with a small amount of water, then the coatings formed in the above (1) were colored or pictured manually with those brushes, followed by heating for 5 to 15 minutes in a dryer held at 160° C. and subsequent washing with water. As a result, the coatings were dyed clearly.

C. Transfer Printing

Printing dye papers (blue and multicolor patterns) (manufactured by Toppan Printing Co.) using sublimation disperse dyes were closely contacted with the coated articles obtained in the above (1), then dried for 15 minutes in a dryer at 180° C. As a result, clearly dyed articles were obtained.

None of the above-dyed coatings, A, B and C exhibited a difference in coating performance from that before dyeing.

EXAMPLE 18

The coating compositions obtained in Examples 14 and 16 were applied to the following substrates D through H in the same way as in Example 1.

On the other hand, diacetone alcohol was added to each of the coating compositions obtained in Examples 14 and 16 to adjust the solid content to 20%, and the resulting coating compositions were each spin-coated to substrate I at 1,000 rpm for 10 seconds and subsequently at 3,000 rpm for 30 seconds. Furthermore, the same coating compositions as those used in the spin coating were applied to substrate J by spray coating.

Baking was performed at 180° C. for 1 hour with respect to substrates D, F, I and J, at 160° C. for 30 minutes with respect to substrates E and H, and at 145° C. for 30 minutes with respect to substrate G.

(1) SUBSTRATES

D. Ceramic Ware

A coffee plate in solid color with a commercially available glaze put thereon and coated with a silane coupling reagent like substrate A in Example 1.

E. Carbon fiber "Torayca" reinforced plastics (manufactured by Toray Industries Inc.)

F. Aluminum Plate

A 0.3 mm thick aluminum plate to which has been applied an epoxy primer (manufactured by Kansai Paint Co.) to a thickness of about 2 μm and then baked at 250° C. for 90 seconds.

G. Polyester film (manufactured by Toray Industries Inc.) 100 μm thick

H. Fluoroplastic Film

A 0.05 mm thick fluoroplastic film which has been subjected to plasma treatment (using oxygen gas, flow rate 100 ml/min, power 50 W, for 30 seconds).

I. Plated Metal Plate

A disc-like, gold-, silver- or nickel-plated metal plate having a diameter of about 5 cm onto which has been applied by dip coating a silane coupling reagent [a 0.5% solution of N-(trimethoxysilylpropyl) ethylenediamine in a methanol/n-propanol mixture].

J. Stainless Steel Plate

A 1 mm thick stainless steel plate.

(2) COATING EVALUATION

The coatings formed after application of the coating compositions to the substrates D through J and subsequent baking were subjected to performance tests in the same manner as in Example 1; as a result, all of them proved to have a good adhesion, a steel wool hardness of A-B and a high water resistance. A sufficient flexibility was also recognized. Furthermore, when subjected to dyeing in the same way as in Example 17, the coatings were all dyed fast and clearly.

EXAMPLE 19

(1) Preparation of Silane Copolymerized Acrylic Varnish

Polymerization was carried out in just the same manner as in Example 1 except that methacryloxypropyl trimethoxy silane used therein as a starting component was substituted by methacryloxypropyl methyl dimethoxy silane. The resulting varnish had a solid content of 51.7%, a viscosity of 5.1 poise and a hydroxyl value of 45 (based on solids).

(2) Preparation of Coating Composition

The procedure of Example 14 was repeated.

(3) Application and Baking

The coating composition prepared above was applied to substrates A and B and then baked in the same way as in Example 2.

(4) Coating Evaluation

When evaluated in the same manner as in Example 1, the coatings obtained in (3) proved to have a steel wool hardness of B (in the case of substrate A) and A-B (in the case of substrate B), a superior adhesion, a high water resistance and a sufficient flexibility.

What is claimed is:

1. A coating composition comprising:
    A. an acrylic polymer having a repeating unit represented by

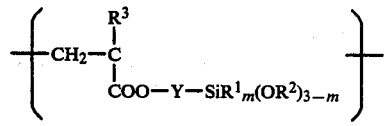

wherein $R^1$ is a methyl or ethyl group, $R^2$ is an alkyl, alkoxyalkyl or acyl group having not more than 4 carbon atoms, $R^3$ is hydrogen or a methyl group, Y is a divalent aliphatic radical having 2 to 10 carbon atoms and m is 0, 1 or 2;
    B. fine particles of silica having an average diameter of particles in the range of 1 to 200 nm; and
    C. a curing catalyst.

2. The coating composition of claim 1 characterized by further including:
    D. at least one member selected from the group consisting of: acrylic resins, polyester resins, alkyd resins, epoxy resins, cellulose resins, amino resins and silicon compounds represented by the general formula $R^5{}_aR^6{}_bSi(OR^7)_{4-(a+b)}$ wherein $R^5$ and $R^6$ are each an alkyl, alkenyl, aryl, halogenated alkyl or alkenyl group having 1 to 10 carbon atoms or an organic group having an epoxy, (meth)acryloxy or cyano group, bonded to silicon by Si-C bond, $R^7$ is an alkyl, alkoxyalkyl or acyl group having 1 to 8 carbon atoms, a and b are each 0, 1 or 2 provided a+b equals 0, 1 or 2.

3. The Coating Composition of claim 3 wherein said curing catalyst is at least one compound selected from the group consisting of:
    1. alkoxide compounds of aluminum or coordination compounds obtained by bonding coordinating compounds to aluminum;
    2. alkoxide compounds of titanium or coordination compounds obtaining by bonding coordinating compounds to titanium; and
    3. coordination compounds obtained by bonding coordinating compounds to Zn(II), Co(II), Fe(II), Cr(III), Mn(II), Ca(II), Co(III), Cu(II), Mg(II), or Ni(II).

4. The coating composition of claim 1, wherein said curing catalyst is at least one compound selected from the group consisting of:
1. alkoxide compounds of aluminum or coordination compounds obtained by bonding coordinating compounds to aluminum;
2. alkoxide compounds of titanium or coordination compounds obtained by bonding coordinating compounds to titanium; and
3. coordination compounds obtained by bonding coordinating compounds to Zn(II), Co(II), Fe(II), Cr(III), Mn(II), Ca(II), Co(III), Cu(II), Mg(II) or Ni(II).

5. The coating composition of claim 3, wherein said component D is at least one member selected from the group consisting of amino resins and compounds represented by the general formula $R^5_a R^5_b Si(OR^7)_{4-(a+b)}$ wherein $R^5$ and $R^6$ are each an alkyl, alkenyl, aryl, halogenated alkyl or alkenyl group having 1 to 10 carbon atoms or an organic group having an epoxy, (meth)acryloxy or cyano group, bonded to silicon by Si-C bond, $R^7$ is an alkyl, alkoxyalkyl or acyl group having 1 to 8 carbon atoms, a and b are each 0, 1 or 2 provided a+b equals 0, 1 or 2.

6. The coating composition of claim 3, wherein said component D is a mixture of an amino resin and an acrylic resin.

7. The coating composition of any one of claims 1, 3 and 2-6 wherein said component A is an acrylic polymer having a hydroxyl value in the range of 10 to 150 and an acid value not larger than 20.

8. The coating composition of any one of claims 1, 3 and 2-6, wherein said component A is an acrylic polymer having a hydroxyl value in the range of 10 to 150 and an acid value not larger than 10.

9. The coating composition of any one of claims 3, 1, 2-6, wherein said component B is used in an amount of 50 to 250 parts by weight based on 100 parts by weight of the total amount of said component A and other coating-forming component(s) other than said component B.

10. The coating composition of any one of claims 3, 1, 2-6, wherein said component B is used in an amount of 70 to 200 parts by weight based on 100 parts by weight of the total amount of said component A and other coating-forming component(s) than said component B.

11. The coating composition of any one of claims 3, 1, 2-6, wherein said component C is used in an amount of 0.01 to 20 parts by weight based on 100 parts by weight of the total amount of solids of said component A, said component B and other coating-forming component(s).

12. The coating composition of any one of claims 3, 1, 2-6 wherein said component C is used in an amount of 0.1 to 10 parts by weight based on 100 parts by weight of the total amount of solids of said component A, said component B and other coating-forming component(s).

13. A coated article comprising a substrate onto which the coating composition as defined in any one of claims 3, 1, 2-6 has been coated and cured.

* * * * *

UNITED STATES PATENT AND TRADEMARK OFFICE
CERTIFICATE OF CORRECTION

PATENT NO. : 4,439,557
DATED : March 27, 1984
INVENTOR(S) : Kawamura, et al.

It is certified that error appears in the above-identified patent and that said Letters Patent is hereby corrected as shown below:

Column 1, line 37, "coposition" should read as --composition--.

Column 3, line 30, "radial" should read as --radical--.

Column 5, line 39, "Mn(III)" should read as --Mn(II)--.

Column 15, line 35, "of" should read as --a--.

Column 17, line 61, "B 11" should read as --Ex 11--.

Column 22, line 55, Claim 3, second "3" should read as --2--.

Column 23, line 21, Claim 5 "(meth-)" should read as --(meth)--.

UNITED STATES PATENT AND TRADEMARK OFFICE
CERTIFICATE OF CORRECTION

PATENT NO. : 4,439,557
DATED : March 27, 1984
INVENTOR(S) : Kawamura, et al.

It is certified that error appears in the above–identified patent and that said Letters Patent are hereby corrected as shown below:

Column 23, lines 30 and 31, Claim 7 "1, 3 and 2-6" should read as --1-6--.

Column 24, lines 3 and 4, Claim 8 "1, 3 and 2-6" should read as --1-6--.

Column 24, lines 7 and 8, Claim 9 "3, 1, 2-6" should read as --1-6--.

Column 24, lines 13 and 14, Claim 10 "3, 1, 2-6" should read as --1-6--.

Column 24, lines 18 and 19, Claim 11 "3, 1, 2-6" should read as --1-6--.

Column 24, lines 23 and 24, Claim 12 "3, 1, 2-6" should read as --1-6--.

UNITED STATES PATENT AND TRADEMARK OFFICE
CERTIFICATE OF CORRECTION

PATENT NO. : 4,439,557

DATED : March 27, 1984

INVENTOR(S) : Kawamura, et al.

It is certified that error appears in the above-identified patent and that said Letters Patent is hereby corrected as shown below:

Column 24, line 30, Claim 13 "3, 1, 2-6" should read as --1-6--.

On the title page, the inventor's name "Giro Mibae" should read -- Jiro Mibae --.

Signed and Sealed this

Twenty-third Day of October 1984

[SEAL]

Attest:

Attesting Officer

GERALD J. MOSSINGHOFF

Commissioner of Patents and Trademarks